United States Patent Office 3,184,217
Patented May 18, 1965

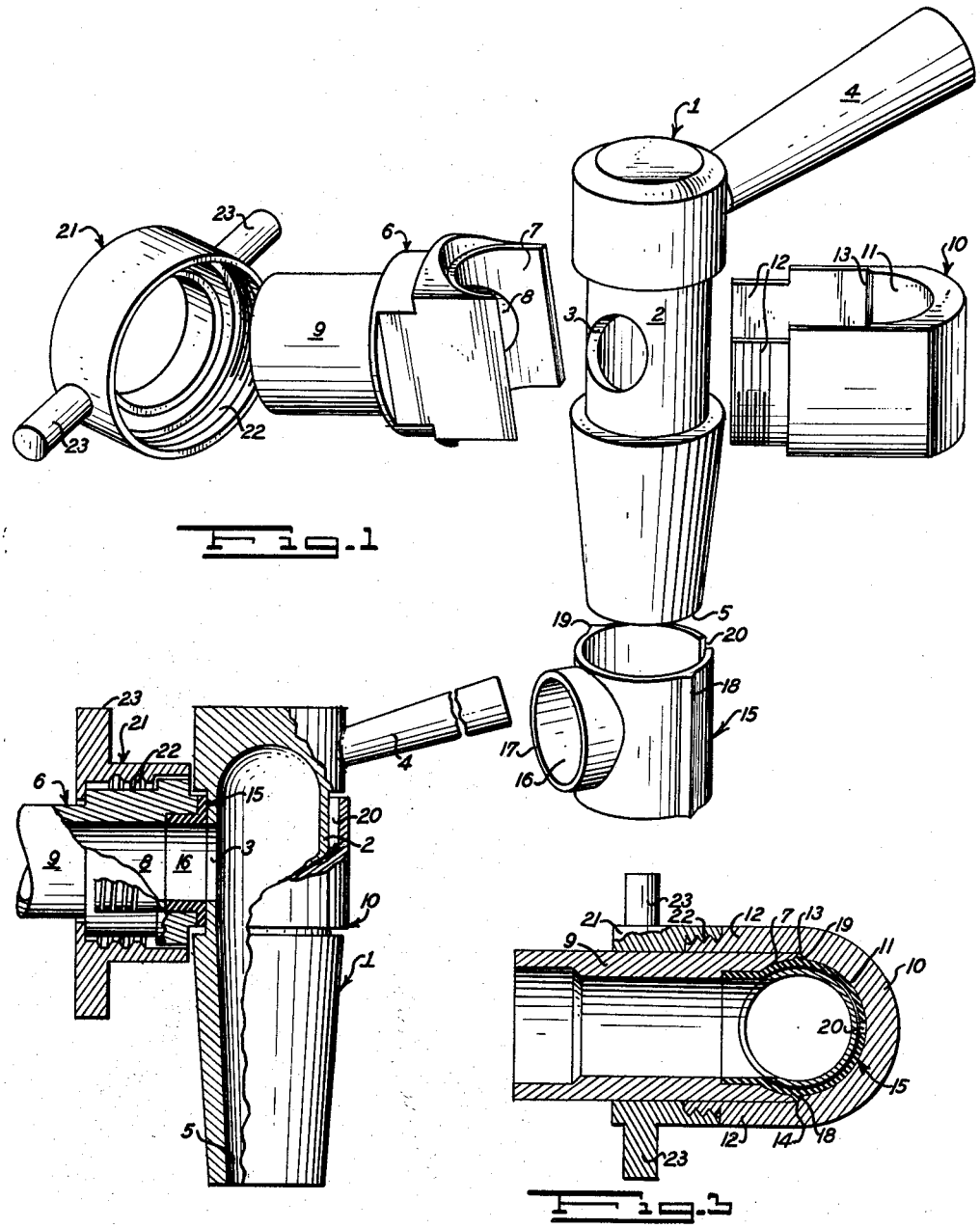

3,184,217
VALVE CONSTRUCTION
Frank Petrin, 41—10 Judge St., Elmhurst, N.Y.
Filed Oct. 5, 1962, Ser. No. 228,644
7 Claims. (Cl. 251—367)

This invention relates to a new valve construction. The invention more particularly relates to a new and improved construction for a valve of the plug-valve type for controlling the flow of fluids.

The invention is particularly useful for applications which require frequent disassembly for cleaning to maintain sanitary conditions and the like, as for example, in connection with the food and dairy industries.

One object of this invention is a simple and efficient valve which is easy to manufacture and extremely reliable and trouble-free in operation, which may be readily assembled and disassembled without the use of tools, and which utilizes seals which may be readily replaced when worn.

This and still further objects will become apparent from the following description read in conjunction with the drawings in which:

FIG. 1 is an exploded perspective view of an embodiment of a valve in accordance with the invention;

FIG. 2 is a cross-section of the valve shown in FIG. 1, and

FIG. 3 is a side elevation, partially in section of the valve in FIG. 1.

The valve in accordance with the invention has a rotatable valve plug of more or less conventional construction except rather than being tapered, it has an outer cylindrical ported portion. The valve housing for this valve plug has a semi-cylindrical ported inner bearing surface formed to receive the outer bearing surface of the plug. A U-shaped member is provided having a semi-cylindrical inner bearing surface, also formed to receive the outer bearing surface of the plug.

The U-shaped member has threaded legs and is positioned with these legs straddling the side walls of the bearing surface of the housing and cooperatively forming with the housing an inner cylindrical bearing surface surrounding the outer cylindrical bearing surface of the valve plug. A flexible inner sleeve encircles the plug between the bearing surfaces to provide a seal and has an opening registering with one of the ports. A nut encircles the housing and is engaging with the legs of the U-shaped member to draw the inner bearing surfaces together. A passage is provided through the housing in communication with the port on the housing bearing surface.

In accordance with the invention, means are provided in order to accurately position the liner sleeve in place and to maintain the same in registry during operation. These means may be in the form of an integral lip extending into the port with which the opening of the sleeve is in registry and preferably in the port on the housing bearing surface. Most preferably, the liner sleeve is a resilient molded liner sleeve, as for example of rubber, with the lip extending as an integral cylindrical wall at right angles to the sleeve. Additionally, or alternately, grooves may be defined between the mating portions of the bearing surfaces of the housing and U-shaped member and the liner sleeve may be provided with ribs extending into these grooves.

Referring to the embodiment shown in the drawing, 1 represents a valve plug of conventional construction except that the same rather than being tapered is provided with the outer cylindrical bearing surface 2 provided with the port 3 which communicates with its hollow interior. The upper end of the valve plug is sealed and provided with the handle 4 for rotating the plug while the lower end is open forming the outlet spout 5.

The valve housing 6 has a semi-cylindrical inner bearing surface 7 which is formed to receive the outer bearing surface 2 of the valve plug. The inner bearing surface 7 is provided with the port 8 which is in communication with the interior of the pipe 9 which is formed as an integral part of the housing and is adapted to be connected to a source of supply of fluid as for example is inserted in the outlet bung of an urn, kettle, or the like, or is connected to a pipe line.

Also forming part of the housing is a U-shaped member 10 having a semi-cylindrical inner bearing surface 11 formed to receive the outer bearing surface 2 of the valve plug. The U-shaped member 11 is also provided with the threaded legs 12 and is positioned with these legs straddling the side walls of the bearing surface 7 of the housing and cooperatively forming with the housing an inner cylindrical bearing surface which surrounds the outer cylindrical bearing surface 2 of the valve plug. The bearing surfaces 7 and 11 are so formed as to define the longitudinal grooves 13 and 14 therebetween as may best be seen in FIG. 2.

A flexible liner sleeve 15 is provided encircling the plug 1 at its bearing surface 2 and has an opening 16 in registry with the port 8 of the housing. The liner sleeve 15 has an integral lip 17 in the form of a cylindrical wall extending at right angles to the sleeve which extends into the port 8. The liner sleeve also has the ribs 18 and 19 which fit into the grooves 14 and 13 and has a longitudinal split 20 to allow insertion and removal. A threaded nut provided with the internal female thread 22 and the bosses 23 encircles the housing 9 and is engageable with the threaded legs 12 to draw the inner bearing surfaces 7 and 11 together and to maintain the valve in the assembled position.

All the elements of the valve with the exception of the liner sleeve 15 and possibly the handle 4 may be constructed of any conventional construction materials, as for example metal, plastic, or glass, but it is preferable, for sanitary purposes, as for example for the food and dairy industry to construct them of stainless steel or Monel. The handle may be constructed of the same material as the remainder of the valve but may, for example, also be constructed of plastic, hard rubber, wood, or the like, or provided with an insulated sheathing.

The liner sleeve 15 is preferably molded of rubber, as for example neoprene rubber, but may be molded of other suitable plastic materials, as for example polyethylene, nylon, fluorinated polyethylene (Teflon), fluorinated-chlorinated polyethylene (Kel-F), polyisocyanate rubber or the like.

The valve is very quickly and easily assembled without the requirement of tools by simply positioning the liner sleeve 15 in place with the lip 17 extending into the port 8, inserting the valve plug 1 into the slit 12 so that it is encircled by the sleeve 15 positioning the U-shaped member 10, and the nut 21 and adjusting for proper tension by means of the hand bosses 23 so that no tools are required.

The correct compression on the liner sleeve 15 in order to ensure leak-proof and yet easy operation may be very quickly and readily adjusted by simply turning the nut 22, the hand turning being facilitated by the bosses 23.

The sleeve 15 is maintained in proper position in registry during operation due to the lip 17 and the ribs 18 and 19.

Due to the construction of the U-shaped member 10 and the nut 21, an even and uniform sealing tension is always applied and an uneven compression on the sleeve 15 which could cause jamming and leakage is not possible.

The valve may be readily assembled and disassembled for cleaning without the use of any tools and the only wearing part is the sleeve member 15 which may be readily and quickly replaced without difficulty.

While the bearing surfaces 2, 7, and 11 are preferably smoothly and accurately ground, the same need not be ground to close tolerances due to the sleeve 15.

In operation fluid will flow through the valve when the handle 4 is turned so that the port 3 is aligned with the port 8 and the valve will be shut when the handle is turned so that the ports are out of registry. Fluid will flow through the pipe 9, the port 8, port 3, out through the spout 5.

Due to the fact that the bearing surface 2 is recessed with respect to the rest of the plug, longitudinal displacement of the plug is prevented.

It is, of course, apparent that the features of the invention, in addition to being applicable to a tap of faucet-type valve as shown are equally applicable to straight or other valves.

Thus, while the invention has been described with reference to specific embodiments, various changes and modifications which fall within the spirit of the invention and scope of the appended claims will become apparent to the skilled artisan. The invention is, therefore, only intended to be limited by the appended claims or their equivalents wherein I have endeavored to claim all inherent novelty.

I claim:
1. A valve comprising a rotatable valve plug having an outer cylindrical ported bearing surface, a housing having a semi-cylindrical ported inner bearing surface formed to receive said outer bearing surface of said plug, a U-shaped member having a semi-cylindrical inner bearing surface formed to receive said outer bearing surface of said plug and having threaded legs, said U-shaped member being positioned with its legs straddling the side walls of the bearing surface of said housing and cooperatively forming with said housing an inner cylindrical bearing surface surrounding the outer cylindrical bearing surface of said valve plug, a flexible liner sleeve encircling said plug between said bearing surfaces to provide a seal, said liner sleeve having an opening registering with one of said ports and an integral lip extending into said port to maintain registry, a nut encircling said housing and engageable with said legs to draw said inner bearing surfaces together and a fluid passage through said housing in communication with the port on the housing bearing surface.

2. A valve according to claim 1 in which said liner sleeve is a resilient molded liner sleeve with said lip extending as an integral cylindrical wall at right angles to said sleeve.

3. A valve according to claim 2 in which said liner sleeve is a rubber sleeve.

4. A valve according to claim 2 in which an opening in said sleeve is in registry with the port in said housing.

5. A valve according to claim 4 in which grooves are defined between the mating portions of said bearing surfaces of said housing and said U-shaped member and in which said liner sleeve has ribs extending into said grooves.

6. A valve according to claim 5 in which said nut is provided with bosses.

7. A valve comprising a rotatable valve plug having an outer cylindrical ported bearing surface, a housing having a semi-cylindrical ported inner bearing surface formed to receive said outer bearing surface of said plug, a U-shaped member having a semi-cylindrical inner bearing surface formed to receive said outer bearing surface of said plug and having threaded legs, said U-shaped member being positioned with its legs straddling the side walls of the bearing surface of said housing and cooperatively forming with said housing an inner cylindrical bearing surface surrounding the outer cylindrical bearing surface of said valve plug, grooves defined between the mating portions of said bearing surfaces of said housing and U-shaped member, a flexible liner sleeve encircling said plug between the inner and outer bearing surfaces to provide a seal, said liner having an opening registering with the port in said housing and being provided with ribs extending into said grooves to maintain registry, a nut encircling said housing and engageable with said legs to draw said inner bearing surfaces together and a fluid passage through said housing in communication with the port on the housing bearing surface.

References Cited by the Examiner
UNITED STATES PATENTS

| | | | |
|---|---|---|---|
| 625,448 | 5/99 | Jaenicher | 285—373 X |
| 812,625 | 2/06 | Weston | 285—197 |
| 1,162,595 | 11/15 | Forzey | 285—199 |
| 1,586,691 | 6/26 | Murray | 251—367 X |
| 2,923,308 | 2/60 | Shohan | 251—367 X |
| 3,061,269 | 10/62 | Sinkler. | |

FOREIGN PATENTS 867,610   5/61   Great Britain.

LAVERNE D. GEIGER, *Primary Examiner.*